United States Patent
Lang

(10) Patent No.: US 11,213,753 B2
(45) Date of Patent: *Jan. 4, 2022

(54) SYSTEMS AND METHODS FOR THE GENERATION OF HEATMAPS

(71) Applicant: Activision Publishing, Inc., Santa Monica, CA (US)

(72) Inventor: Stephen A. Lang, Lyons, CO (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,185

(22) Filed: Jun. 1, 2020

(65) Prior Publication Data

US 2020/0360812 A1 Nov. 19, 2020

Related U.S. Application Data

(63) Continuation of application No. 16/578,723, filed on Sep. 23, 2019, now Pat. No. 10,702,779, which is a
(Continued)

(51) Int. Cl.
*A63F 13/5378* (2014.01)
*A63F 13/67* (2014.01)
*A63F 13/46* (2014.01)

(52) U.S. Cl.
CPC .......... *A63F 13/5378* (2014.09); *A63F 13/46* (2014.09); *A63F 13/67* (2014.09)

(58) Field of Classification Search
CPC ....... A63F 13/5378; A63F 13/46; A63F 13/67
See application file for complete search history.

(56) References Cited

U.S. PATENT DOCUMENTS

| 4,129,859 A | 12/1978 | Iwamura |
| 4,442,495 A | 4/1984 | Sukonick |

(Continued)

FOREIGN PATENT DOCUMENTS

| AU | 768367 | 3/2004 |
| AU | 2005215048 | 10/2011 |

(Continued)

OTHER PUBLICATIONS

Wikipedia: Minecraft, May 12, 2014, <https://en.wikipedia.org/w/index.php?title=Minecraft&oldid=608156811 >.

*Primary Examiner* — Kevin Y Kim
(74) *Attorney, Agent, or Firm* — Novel IP

(57) ABSTRACT

The present specification describes systems and methods for efficiently generating scaled down versions of heatmaps that can be presented in real-time to a player. Data representative of events in a video game are recorded at occurring at one or more coordinates within a virtual geographical landscape of the video game. The virtual geographical landscape is divided into subsections to form a secondary map. Performance metrics are generated based on the data and assigned to at least one of the subsections based on the one or more coordinates. The heatmap is formed and displayed by generating a non-alphanumeric visual representation of the performance metrics and overlaying the non-alphanumeric visual representation of the performance metrics on the secondary map. Locations of the non-alphanumeric visual representation of the performance metrics is based on to which subsections the generated performance metrics was assigned.

20 Claims, 5 Drawing Sheets

Related U.S. Application Data continuation of application No. 15/354,406, filed on Nov. 17, 2016, now Pat. No. 10,463,964.

(56) References Cited

U.S. PATENT DOCUMENTS

| | | |
|---|---|---|
| 4,533,910 A | 8/1985 | Sukonick |
| 4,642,790 A | 2/1987 | Minshull |
| 4,796,201 A | 1/1989 | Wake |
| 4,831,556 A | 5/1989 | Oono |
| 4,860,217 A | 8/1989 | Sasaki |
| 5,148,154 A | 9/1992 | MacKay |
| 5,303,388 A | 4/1994 | Kreitman |
| 5,392,388 A | 2/1995 | Gibson |
| 5,412,768 A | 5/1995 | Ozaki |
| 5,422,987 A | 6/1995 | Yamada |
| 5,446,833 A | 8/1995 | Miller |
| 5,454,371 A | 10/1995 | Fenster |
| 5,463,729 A | 10/1995 | Kitaguchi |
| 5,511,157 A | 4/1996 | Wang |
| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,964,660 A | 10/1999 | James |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |

(56) References Cited

U.S. PATENT DOCUMENTS

| | | |
|---|---|---|
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2004/0255040 A1* | 12/2004 | Lopes .................. H04L 1/0034 709/230 |
| 2009/0113448 A1 | 4/2009 | Smith |
| 2009/0149261 A1* | 6/2009 | Chen .................. G07F 17/3244 463/42 |
| 2012/0124189 A1 | 5/2012 | Haggar |
| 2014/0038708 A1* | 2/2014 | Davison ............... A63F 13/335 463/31 |
| 2014/0344725 A1 | 11/2014 | Bates |
| 2016/0191671 A1 | 6/2016 | Dawson |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |

(56) References Cited

FOREIGN PATENT DOCUMENTS

| | | | |
|---|---|---|---|
| CN | 1202652 | C | 10/2002 |
| CN | 1141641 | C | 3/2004 |
| CN | 1494679 | A | 5/2004 |
| CN | 1219384 | | 9/2005 |
| CN | 1307544 | | 3/2007 |
| CN | 100407675 | | 7/2008 |
| CN | 100423016 | C | 10/2008 |
| CN | 100557637 | | 11/2009 |
| CN | 101001678 | B | 5/2010 |
| CN | 101436242 | | 12/2010 |
| CN | 101801482 | B | 12/2014 |
| EP | 668583 | | 8/1995 |
| EP | 0627728 | B1 | 9/2000 |
| EP | 0717337 | B1 | 8/2001 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |
| GB | 2339938 | | 10/2002 |
| GB | 2352154 | | 7/2003 |
| JP | 3033956 | B2 | 4/2000 |
| JP | 3124916 | B2 | 1/2001 |
| JP | 3177221 | B2 | 6/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| MY | 117864 | A | 8/2004 |
| SG | 55396 | | 12/1998 |
| WO | 2002073457 | | 9/2002 |
| WO | 2002087156 | | 10/2002 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

* cited by examiner

| Metric | Exponential Smoothing | Moving Average |
|---|---|---|
| 0.200 | 0.200 | 0.200 |
| 0.100 | 0.170 | 0.150 |
| 0.000 | 0.119 | 0.100 |
| 0.050 | 0.098 | 0.088 |
| 0.090 | 0.096 | 0.088 |
| 0.100 | 0.097 | 0.090 |
| 0.200 | 0.128 | 0.106 |
| 0.250 | 0.165 | 0.124 |
| 0.180 | 0.169 | 0.130 |
| 0.090 | 0.145 | 0.126 |
| 0.050 | 0.117 | 0.111 |
| 0.040 | 0.094 | 0.105 |
| 0.040 | 0.078 | 0.109 |
| 0.080 | 0.078 | 0.112 |
| 0.090 | 0.082 | 0.112 |
| 0.130 | 0.096 | 0.115 |
| 0.180 | 0.121 | 0.113 |
| 0.160 | 0.133 | 0.104 |
| 0.120 | 0.129 | 0.098 |
| 0.100 | 0.120 | 0.099 |

FIG. 3

SYSTEMS AND METHODS FOR THE GENERATION OF HEATMAPS

CROSS REFERENCE

The present application is a continuation application of U.S. patent application Ser. No. 16/578,723, entitled "Bandwidth and Processing Efficient Heatmaps" and filed on Sep. 23, 2019, which is a continuation application of U.S. patent application Ser. No. 15/354,406, entitled "Systems and Methods for the Real-Time Generation of In-Game, Locally Accessible Heatmaps", filed on Nov. 17, 2016, and issued as U.S. Pat. No. 10,463,964 on Nov. 5, 2019, both of which are herein incorporated by reference in their entirety.

FILED

The present specification is related generally to the field of gaming, animation and computer graphics. More specifically the present specification is related to a method for automatically generating in-game heatmaps in video games that allow video game players to evaluate their performance in real time.

BACKGROUND

In many video games, a player may compete against another player either in person or via an online platform that integrates the play of multiple players through a network. Many online games offer leaderboards which allow a player to judge how a particular game play session compared against other game players. However, it is often difficult to compare the player's skill to another player's since many conventional leaderboards measure a level achieved or certain standard statistics, but may not consider the amount of time played to do so. Further, many players are driven by and desire to compete at all levels of game play. For example, a player may desire to not only be the player with the highest score but also to be the best player with a particular game weapon or accessory or a combination thereof.

Thus, the ability to evaluate their performance, at varying degrees of detail, in real-time is valuable for video game players, especially when playing competitive online multiplayer games. Simple performance metrics are often used to display basic statistics on performance. Examples of such metrics include the number of kills, kill/death ratio, scores, achievements, timings, and levels passed. The ability to display performance over a geographical map of a virtual game can add valuable information on performance at specific map engagement areas, map lanes and choke points. Spatial data like this can be displayed as a heatmap or colored overlay on the underlying 2D map. Video games however, are challenged to provide and manage such maps in-game and in near real-time, that is, as a player is engaged in a game play session.

One of the major challenges encountered by video game programs in providing detailed real time performance data for each player is the management of data of numerous players based on such non-standard statistics. Further, in online multiplayer games usually very little historical information about a player is available on the game client, such as a console, PC or mobile device. This is because such a feature is highly bandwidth and memory intensive, as it requires the player information to be loaded and saved between matches. Trying to store and manage large amounts of historical performance information is not feasible, as it would have to be uploaded each time a match is played. However, to provide a detailed heatmap, such player information is required.

There is therefore a need for a method and system that addresses the above challenges and provides performance data in real time to the players and also presents the data in a simplified and easy to understand manner, such as in the form of a heatmap. It is also desired that the system provides historical measure of a player's performance, thus processing to accumulate data over a number of matches, rather than providing just a single metric over the last match played.

SUMMARY

The present specification describes a system and method for generating heatmaps representing individual players' performance level in a videogame, in real time. The system described here provides a unique solution to the various challenges presented for creating and managing heatmaps with real-time updates. The present method minimizes the amount of data stored and also minimizes the bandwidth with the game client.

In some embodiments, the present specification discloses a computer-implemented method for generating and displaying a heatmap while a player is actively playing a video game on a computing device comprising: recording data representative of a plurality of events in said video game, wherein said plurality of events occurs at one or more coordinates within a virtual geographical landscape of said video game; dividing said virtual geographical landscape into a plurality of subsections to form a secondary map of said virtual geographical landscape, wherein the secondary map has a lower resolution than said virtual geographical landscape; generating performance metrics based on said data and assigning said generated performance metrics to at least one of said plurality of subsections based on said one or more coordinates; and forming and displaying a heatmap by generating a non-alphanumeric visual representation of said performance metrics and overlaying said non-alphanumeric visual representation of said performance metrics on said secondary map, wherein a location of said non-alphanumeric visual representation of said performance metrics is based on to which at least one of said plurality of subsections said generated performance metrics was assigned.

Optionally, the heatmap is generated and displayed locally on said computing device.

Optionally, a size of each of the plurality of subsections is based on an amount of said data representative of a plurality of events that has been recorded.

Optionally, said non-alphanumeric visual representation of said performance metrics is achieved by varying at least one of a color, a luminance, a hue, a brightness, and a contrast of a pixel as a function of a value of each of said performance metrics.

Optionally, said performance metrics include at least one of a kill/death ratio, a score per minute, an amount of time spent, a path pattern, a player lane use pattern, an objective path pattern, a use of a special ability, an accuracy of weapon use, a number of points obtained, a number of points lost, a number of achievements obtained, a number of achievements lost, an amount of health status obtained, an amount of health status lost, an amount of tokens obtained, an amount of tokens lost, an amount of treasure obtained, and an amount of treasure lost.

Optionally, said performance metrics are generated by weighing data representative of a plurality of events in said video game that have been recorded later in time more heavily than data representative of a plurality of events in said video game that have been recorded earlier in time.

Optionally, said performance metrics are generated by applying a smoothing function on said data, wherein said smoothing function weights data from a new game played more than data generated from games played before the new game.

Optionally, said performance metrics are generated by applying a function represented by: $s_t = \alpha \cdot x_t + (1-\alpha) \cdot s_{t-1}$, wherein $s_t$ is a new metric after updating with data from a new game played, $\alpha$ is a smoothing factor, $x_t$ is the data from said new game played, and $s_{t-1}$ is a previous metric before the new game was played.

Optionally, the video game comprises a plurality of modes and wherein a different heatmap is generated for each of said plurality of modes.

In some embodiments, the present specification discloses a computer readable non-transitory medium comprising a plurality of executable programmatic instructions wherein, when said plurality of executable programmatic instructions are executed by a processor in a computing device, a process for generating and displaying a heatmap is performed, while a player is actively playing a video game on the computing device, said plurality of executable programmatic instructions comprising: programmatic instructions, stored in said computer readable non-transitory medium, for recording data representative of a plurality of events in said video game, wherein said plurality of events occurs at one or more coordinates within a virtual geographical landscape of said video game; programmatic instructions, stored in said computer readable non-transitory medium, for dividing said virtual geographical landscape into a plurality of subsections to form a secondary map of said virtual geographical landscape, wherein the secondary map has a lower resolution than said virtual geographical landscape; programmatic instructions, stored in said computer readable non-transitory medium, for generating performance metrics based on said data and assigning said generated performance metrics to at least one of said plurality of subsections based on said one or more coordinates; and programmatic instructions, stored in said computer readable non-transitory medium, for forming and displaying a heatmap by generating a non-alphanumeric visual representation of said performance metrics and overlaying said non-alphanumeric visual representation of said performance metrics on said secondary map, wherein a location of said non-alphanumeric visual representation of said performance metrics is based on to which at least one of said plurality of subsections said generated performance metrics was assigned.

Optionally, said heatmap is generated and displayed locally on said computing device.

Optionally, the computer readable non-transitory medium further comprises programmatic instructions, stored in said computer readable non-transitory medium, for determining a size of each of the plurality of subsections, wherein the size of each of the plurality of subsections is based on an amount of said data representative of a plurality of events that has been recorded.

Optionally, the computer readable non-transitory medium further comprises programmatic instructions, stored in said computer readable non-transitory medium, for generating the non-alphanumeric visual representation of said performance metrics by varying at least one of a color, a luminance, a hue, a brightness, and a contrast of a pixel as a function of a value of each of said performance metrics.

Optionally, said performance metrics include at least one of a kill/death ratio, a score per minute, an amount of time spent, a path pattern, a player lane use pattern, an objective path pattern, a use of a special ability, an accuracy of weapon use, a number of points obtained, a number of points lost, a number of achievements obtained, a number of achievements lost, an amount of health status obtained, an amount of health status lost, an amount of tokens obtained, an amount of tokens lost, an amount of treasure obtained, and an amount of treasure lost.

Optionally, the computer readable non-transitory medium further comprises programmatic instructions, stored in said computer readable non-transitory medium, for weighing data representative of a plurality of events in said video game that have been recorded later in time more heavily than data representative of a plurality of events in said video game that have been recorded earlier in time in order to generate said performance metrics.

Optionally, the computer readable non-transitory medium further comprises programmatic instructions, stored in said computer readable non-transitory medium, for applying a smoothing function on said data, wherein said smoothing function weights data from a new game played more than data generated from games played before the new game.

Optionally, the computer readable non-transitory medium further comprises programmatic instructions stored in said computer readable non-transitory medium, for applying a function represented by: $s_t = \alpha \cdot x_t + (1-\alpha) \cdot s_{t-1}$, wherein $s_t$ is a new metric after updating with data from a new game played, $\alpha$ is a smoothing factor, $x_t$ is the data from said new game played, and $s_{t-1}$ is a previous metric before the new game was played.

Optionally, the video game comprises a plurality of modes and wherein the computer readable non-transitory medium further comprises programmatic instructions, stored in said computer readable non-transitory medium, for generating a different heatmap for each of said plurality of modes.

Optionally, the computer readable non-transitory medium further comprises programmatic instructions, stored in said computer readable non-transitory medium, for scaling up a size of the heatmap.

Optionally, the computer readable non-transitory medium further comprises programmatic instructions, stored in said computer readable non-transitory medium, for applying a blurring or smoothing technique for scaling up the size of the heatmap.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings:

FIG. 3 is a table illustrating examples of using exponential smoothing and a simple moving average of the previous 10 matches in accordance with one embodiment of the present specification;

DETAILED DESCRIPTION

Figure 1:
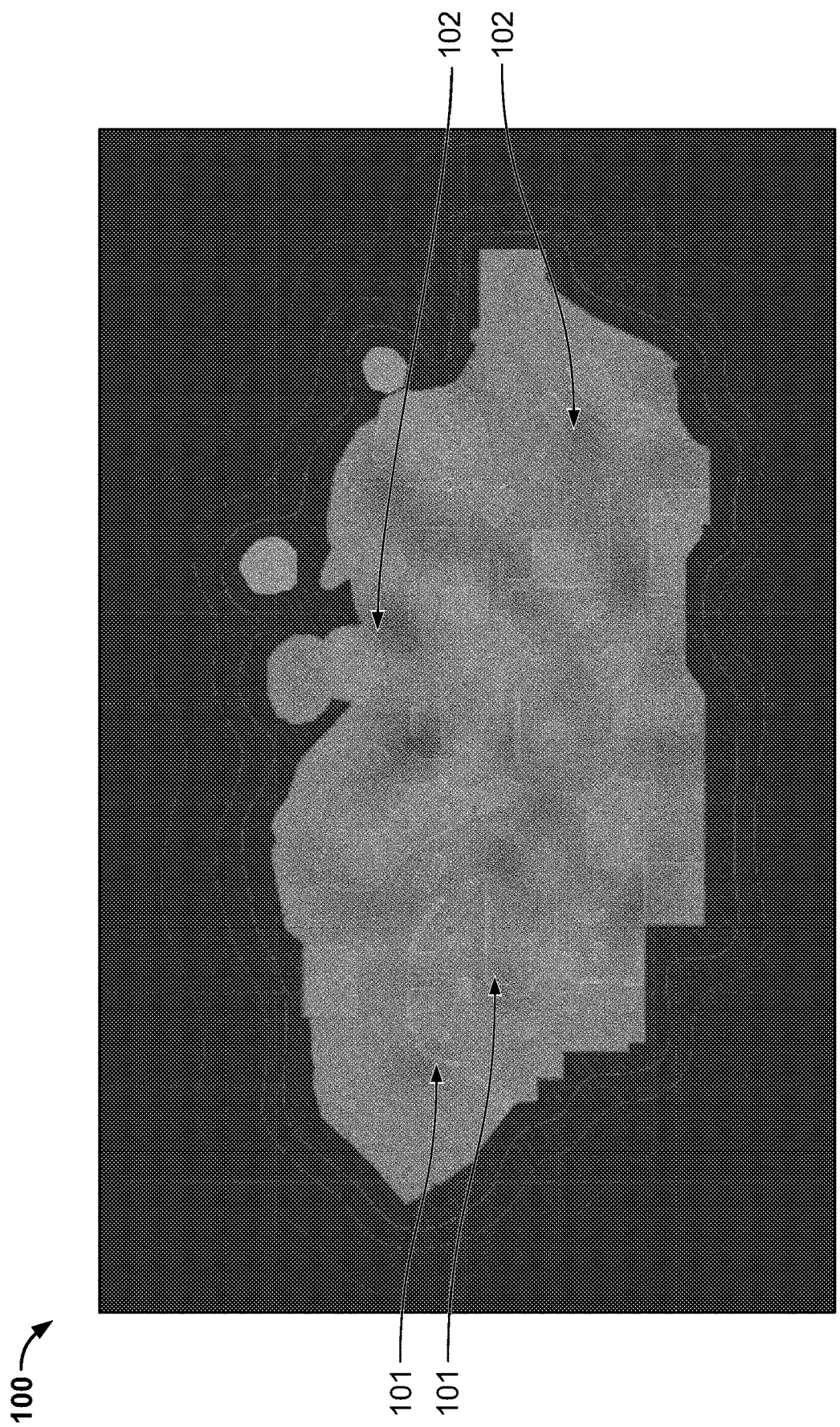
FIG. 1 illustrates a heatmap for an individual player's performance in an exemplary video game, according to one embodiment of the present specification.

In one embodiment, the present specification describes a method for displaying current as well as historical measures of a player's performance, in an easy to understand manner and in near real-time, as a video game is played. The method of present specification takes into account the changing level of a player's skill over time, as they play the game more and more, and also accounts for multiple game modes with different objectives and playing strategies. In one embodiment, the present method presents a player's behavior and performance as measured over game map, game mode and time. Most importantly, the systems described herein provide a unique solution to the various challenges presented by the need for creating and managing heatmaps with real-time updates, minimizing the amount of data stored and minimizing the bandwidth with the game client.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

It should be noted herein that any feature or component described in association with a specific embodiment may be used and implemented with any other embodiment unless clearly indicated otherwise.

It should be appreciated that the programmatic methods described herein may be performed on any computing device, including a laptop, desktop, smartphone, tablet computer, specialized gaming console, or virtual reality system. The computing device comprises at least one processor and a nonvolatile memory that stores the programmatic instructions which, when executed by the processor, perform the methods or steps disclosed herein, including the generation of a graphical user interface that is communicated to a local or remote display. The computing device is in communication with at least one remotely located server through a network of any type.

As used herein, the term "heatmap" shall mean a graphic representation of data, such as the number of kills or kills per engagement, where the individual values of the data 1) are represented by pixels having differing colors, luminance, hue, brightness, and/or contrast and 2) are positionally mapped based on where one or more of those parameters were achieved in the game, thereby presenting a geographical distribution of those individual values across a graphical user interface. A heatmap communicates those individual values of data without using alphanumeric characters, only relying on pixels of differing colors, luminance, hue, brightness, and/or contrast to communicate the actual values of that data, although it may have other alphanumeric characters as legends or other information. Accordingly, a heatmap has non-alphanumeric visual representations of performance metrics.

As used herein, the term "real-time" shall mean the occurrence of an event, such as the display of a heatmap, during, or concurrent with, another event, such as the playing of a game.

As used herein, the term "in game" shall mean the presentation of data in the course of a video game playing session, e.g. while a player is actively engaged in playing a video game.

In one embodiment, the system and method of present specification presents a player's performance in the form of a heatmap, which illustrates the player's performance in different areas on a geographical map of the virtual game being played. FIG. 1 illustrates an example of a heatmap 100, for an individual player's performance in an exemplary video game. Referring to FIG. 1, darker gray areas 102 show where the player performed well and lighter gray areas 101 highlight the game areas where the player performed poorly, as measured by specific individual parameters.

As defined above, the coloring, luminance, hue, brightness, and/or contrast used in a heatmap can represent many different performance metrics in a video game, such as kill/death ratio, scores per minute, time spent, path patterns, player lane use patterns, objective path patterns, special ability use, weapon accuracy, points obtained, points lost, achievements obtained, achievements lost, health status, tokens obtained, tokens lost, treasure obtained, and treasure lost, as well as map area control information.

A kill/death ratio is a measure of how many deaths the player has caused (i.e., through shooting or explosions) relative to how many lives the player has used to do so. For example, if a player has caused 16 deaths and expended 4 lives to do so, the player's kill/death ratio would be 4. The scores per minute metric measures how many points or how much value a player generates for every minute the player has played the game. The time spent metric measures how much time a player has spent at locations in the game. The path pattern metric visually denotes the specific paths a player takes, or has taken, through the game. The special ability use measures what abilities, such as increased strength, increased speed, invisibility, teleportation, among others, the player has used at each location in the game. The weapon accuracy metric measures how many shots successfully hit their target relative to the number of shots that failed to successfully hit their target.

In one embodiment, the present method generates heatmaps as a video game is played to display individual parameters referred to as "kills per engagement", which is defined as the ratio of (kills−death)/(kills+deaths) or (K−D)/(K+D), where kills refers to the number of other characters the player has killed and deaths refers to the number of lives expended by the player. In one embodiment, the range of "kills per engagement" metric varies between −1.0 and 1.0 and is not open ended, in contrast to a "kills per death" (K/D) ratio. One of ordinary skill in the art would appreciate that K/D ratio varies between 0 and the number of kills in the game (all kills and no deaths).

Figure 2:
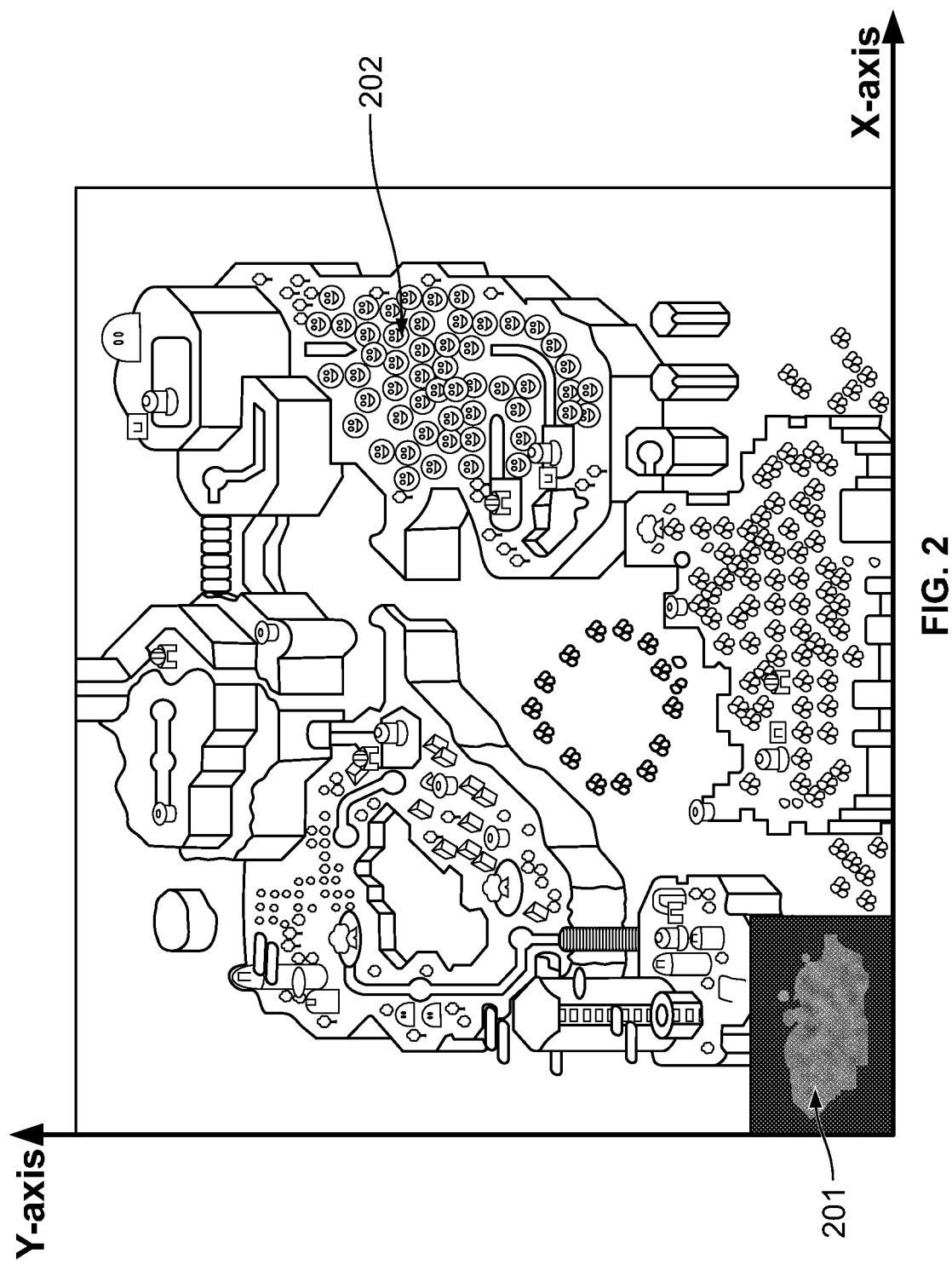
FIG. 2 illustrates a secondary map generated to represent the actual geographical map of a virtual game, in accordance with an embodiment of the present specification.

In one embodiment, the present method calculates the "kills per engagement" metric for locations the actual game to obtain a 2D array of values that can be overlaid on the secondary game map space, which is a lower resolution version of the actual game map, to yield a heatmap. FIG. 2 illustrates a secondary game map space generated as a representation of the overall geographical map of a virtual game. It may be noted that the secondary game map is a virtual space where event locations are continuously recorded by the system. The purpose of the virtual space is to aggregate the contributions of any events that occur within that space. Events include kills, deaths, scores, time spent, paths taken, special abilities used, weapons used, the accuracy of the weapons used, points obtained, points lost, achievements obtained, achievements lost, health obtained, health lost, tokens obtained, tokens lost, treasure obtained or treasure lost, or derivations thereof.

In one embodiment, the system records each event, as it occurs, by assigning both a value to the event and a location that corresponds to a position in the secondary game map space. The system optionally processes that event value to create a specific performance metric, such as kill/death ratio or time spent per minute, which remains assigned to the same position in the secondary game map space. The system then presents the event value and/or specific performance metric in the form of a heatmap based upon the secondary game map space.

Referring to FIG. 2, an exemplary secondary game map space 201 is selected as a representation of the X-Y co-ordinate system of the actual game map 202. Thus, for example, if an actual map has a coordinate system in inches and covers an area of 500 by 500 feet, the size of the secondary game map space may be chosen, for example, 30×30 cells (900 total) and the same may be used to generate a heatmap. Thus, all the events that occur in the game map space are accumulated or summed within the chosen space to create data that is at a lower resolution than the game event coordinates. Stated differently, the virtual geographical landscape of the game is divided into a plurality of subsections to form a secondary map, where the secondary map has a lower resolution than the virtual geographical landscape.

Thus, the heatmap is a smaller, lower resolution, version the actual map. In one embodiment, the heatmap is not overlaid on the map of the game; rather, all events recorded in a given area of the actual map are recorded in the proportional or corresponding cell of the chosen fixed size grid. The system is programmed to translate an event occurring at a specific location in the original virtual geographical map to a scaled or proportional location in the scaled down, or second, virtual geographical map. It should be appreciated that the heatmap has a lower resolution because it contains less visual detail than the original virtual geographical map and has a small width, height, and/or number of pixels than the original virtual geographical map.

It may be noted that the choice of the size of the secondary game map within the map coordinates depends on a number of factors, including the type and numeric quantity of raw data. If the resolution of the secondary game map is too low, the events will cluster in a limited number of regions, which may not be meaningful. If the resolution is too high, then the ability to meaningfully calculate and display a given metric, such as kill/death ratio, is lost because, when the resolution is very high, small data sets, such as only one kill or one death in a location, may appear as an extremely small, perhaps imperceptible, dot. As a result, many of the recorded metrics may be difficult to see.

Thus, the preferred size of the secondary game map is dependent on the raw data. In one embodiment, the preferred size is inferred from the data and is determined after the data has been collected. Accordingly, the system comprises programmatic instructions that, when executed, analyzes the data from the standpoint of data density, data clustering, or other data metrics and determines an appropriate secondary game map size to allow for the proper display of the specific data set collected.

In some embodiments, the heatmap is implemented by generating a performance map using a 2D co-ordinate system and overlaying on the actual geographical map of the game. The underlying geographical map provides spatial information for the heatmap data, and helps to evaluate where, for example, high performance locations are associated with specific areas on the geographical map. In some embodiments, a 3D heatmap is generated, which appears as 3D clouds overlaid on a 2D or 3D geographical map. The player is provided with the ability to rotate and view this 3D performance map to view from different angles.

One of ordinary skill in the art would appreciate that it is not optimal to simply compute and display a single metric over a single match played; instead, it is preferable to additionally include historical measures of a player's performance. In one embodiment, the present system accumulates data for the same metrics over a number of matches and processes that data to arrive at a measure that reflects historical performance. It may further be noted that that a player's skill changes over time. Therefore, accumulating performance data over all time will not reflect recent changes in player performance, as recent performance contributions will be averaged with all performances over time. Thus, in one embodiment, the present method computes a moving average over fixed number of matches to best reflect a player's current performance. In one embodiment, the present method takes into account the last 10 matches played to generate the average. It should be appreciate, however, that this number can range from 2 to 100 matches in any whole number increment therein.

In one embodiment, the present method takes into account multiple game "modes" with different objectives and playing strategies that can be played in a virtual game. As an example, some common game modes for first person shooter games include "capture the flag" where teams attempt to control and return a flag to their base, "king of the hill" where teams attempt to control specific locations on the map which periodically rotate to other locations and "death match" where teams simply attempt to get more kills than their opponents. The location of objective points or absence of them as in the case of "death match" greatly influences how players move and perform on a particular map, and thus generate very different heatmaps. Accordingly, player performance is not just measured over a game map, but also measured with respect to a specific game mode and a game time. In one embodiment, the present method computes several other metrics, apart from kills per engagement, such as player time spent in each grid cell, "scores per minute" and a kill-death ratio (K/D), to account for varying game modes.

As known in the art, in online multiplayer games there is usually very little historical information about a player available on the game client, such as a console, PC or mobile device because of the need to load and save the player information between matches. Trying to store and manage large amounts of historical performance information is not possible as it would have to be uploaded each time a match is played, thereby substantially delaying a gaming experience. Raw match summary data for all players is typically uploaded at the end of each match. In one embodiment, the system of present specification uses a server, remotely located relative to the gaming client being used by the player, to store the raw match summary data at the end of each match. This information is then used to create heatmaps for individual players, taking into account their most recent matches. It may be noted that any technology or set of technologies suitable for the purpose may be used to accomplish this client-server architecture.

One of ordinary skill in the art would appreciate that even with a server store, storing historical data for all players across game maps, modes and a time window is a challenge when there are millions of players. The following sections describe various problems related to storage and management of large amounts of data, and the solutions provided by the present specification to address the same.

Binning Raw Data

As known in the art, it is possible to store detailed information on every kill and death by a player in a match from which performance heatmaps can be generated. However, this is more detail than is typically needed to create a heatmap. Storing raw coordinate information for every event, kill or death for instance, would grow very large. It would be preferred to combine events that fall within a portion of the map of a specific size (e.g. a cell). By combining the contributions of these events, this results in a fixed maximum storage size, which is the total number of discrete portions of the map, e.g. cells or plurality of subsections. Therefore, in one embodiment, the present method applies histogram binning to the raw data to create metrics within a fixed number of cells. The system performs histogram binning by adding the contributions of all events in a match that occur within each cell, defined as a portion of the map which corresponds to a subset of the geographical map coordinates. Using this approach, a secondary map size much smaller than the raw coordinates used in game may be used to generate useful heatmaps. For example, a grid of 30 by 30 cells (900 total) may be enough to create a heatmap, for a game coordinate size of approximately 500 by 500 feet in virtual coordinates. This would show enough detail for many performance metrics, and any additional detail may not be necessary.

It may be noted that too large a binning grid can result in very sparse data with insufficient counts to be able to calculate and effectively display the metric. Storing an intermediate amount of gridded data is more efficient than storing detail on individual kills and deaths.

It may further be noted that when this processing is performed on raw match data, such as kill and death locations, the desired metric is calculated for each cell in the grid. This typically results in a sparse array of values with only information for locations where one or more events are recorded. As a further optimization, rather than storing the entire set of values for all the cells, the present method stores only the row and column indices and metric value for locations where data is nonzero. This further saves on disk storage. Accordingly, in one embodiment, the data set for the heatmap only includes non-zero data values with associated cell, grid or coordinate locations and does not include any cell, grid or coordinate locations without associated metric values.

Data Selection and Smoothing

As mentioned earlier, the system of present invention stores a player's performance over a fixed period of time, such as for example across the last 10 matches played for a particular map and mode combination. Aggregating data over multiple games is more representative of a player's current performance, since it represents matches played at their current skill level and provides relevant information for a player trying to understand where they have improved, and need to improve, on a particular map or mode. Taking into account a fixed number of recent matches is more useful than averaging over all time, as past performance at lower skill levels may dominate the metrics and might result in heatmaps that do not present correct information regarding current skill levels of a player. In order to accomplish this, game match heatmaps over a period of time need to be combined in order to represent some kind of average performance by the player. This may be accomplished by storing a set of recent heatmaps for individual matches and combining them, or as suggested below by using a more memory efficient approach.

It may be appreciated that storing a sparse grid of metrics as described above for many matches has a number of challenges. In order to calculate a moving average of performance over time there is the need to drop the oldest match information when a new match is played. Even if a window of the last 10 matches played is considered, the system needs to store information across all maps and for all modes.

In one embodiment, the system generates a plurality of cells for a secondary game map and incrementally adds performance metrics from new matches, generating an average performance over all historical games played, on cell-by-cell basis. The system then executes a plurality of programmatic instructions to generate a summary metric, which embodies values from historical games played, and applies a smoothing function to compute a new performance metric that weights each new match more than the summary metric generated from matches occurring before the new match. With this approach, previous matches contribute a decreasing effect on the summary measure over time, resulting in new matches contributing more and earlier matches contributing less to the overall metric average. For example, each metric from games 1 to n−1 has less weight than a metric from game n. The preferred function is an exponential smoothing function and represented by:

$$s_t = \alpha \cdot x_t + (1-\alpha) \cdot s_{t-1}$$

Where:

$s_t$ is the new smoothed metric after updating with metric data from a new match $\alpha$ is a smoothing factor as described below $x_t$ is the metric, such as "kills per engagement" or other metric, for the latest match $s_{t-1}$ is the previous smoothed metric before the latest match was played.

Depending on the smoothing factor $\alpha$ used, the effect of this computation is that over a certain number of past matches all contributions are effectively lost. Accordingly, the system executes a plurality of programmatic instructions that receives a first set of metric data into memory, said first set of metric data comprising a first value associated with a game parameter and a second value associated with a timestamp, game number, or other identifier indicating a time order in which that first value was generated. The system also executes a plurality of programmatic instructions that receives a second set of metric data into memory, said second set of metric data comprising a third value associated with the same game parameter as the first value and a fourth value associated with a timestamp, game number, or other identifier indicating a time order in which that third value was generated. This process repeats thereby resulting in the memory having n sets of metric data comprising n values associated with the same game parameter and n values associated with timestamps indicating a time order in which those n values for the game parameters were generated. The system then executes a plurality of programmatic instructions that applies a function which weights, or increases the relative mathematical contribution to an overall or summary metric, of all values derived from games greater than m relative to all values derived from games less than m, where $1<m<n$. In one embodiment, m is 10. In another embodiment, m is any whole number between n and 1.

When a new value associated with a metric, and derived from the playing of a game, is obtained, it is added to the summary metric through the functions described above. This approach enables the system to locally store a weighted function and then incrementally add new data as received. Locally storing and managing only one grid (set of cells) of metrics per player for a given map and mode combination eliminates the need to locally store all values from historical matches at each point in the map and then recalculate an average each time a new game is played. For example, rather than locally store n values associated with m different locations on a virtual map, the client locally stores a single summary metric function associated with m different locations on a virtual map, each summary metric function being representative of weighted values from the n games played, and then updates that summary metric function with new data after each game is played. Thus, for the example, if metric data for the last 10 matches is to be stored, the present method mimics the actual storage by storing grids with summary metrics, thereby reducing the amount of storage required by a factor of 10.

FIG. 3 is a table illustrating examples of using exponential smoothing and a simple moving average of the previous 10 matches. Referring to FIG. 3, column 301 represents the current value of the performance metric, such as "kills per engagement" or any other metric. Column 302 lists the exponential smoothing values. In the present case, exponential smoothing was applied using a smoothing factor of 0.3, and as described above only the previous value of the metric and the new metric are needed for the computation of smoothed metric. Column 303 enlists the moving average of a fixed number of previous metrics. Thus, to compute a moving average of 10 metrics, the previous 10 values need to be stored.

While bandwidth has expanded, for applications where latency issues are to be avoided and bandwidth demands are high, such as multi-player gaming, it is essential to architect systems that minimize bandwidth demands wherever possible. In that light, while providing players with heatmaps representative of historical metrics may be readily done via a server, it is often desirable to generate and display those heatmaps on the local client, as described above, in order to minimize bandwidth demands and latency issues. This is especially true when a game has multiple different heatmaps representing different modes of play and different metrics and when each of those heatmaps needs to be displayed in real-time. In such cases, creating heatmap images on a server, downloading them to the client, and then repeatedly updating the heatmaps on the server with new data and downloading new heatmaps after each match played would be impractical and result in a poor user experience. The amount of data needed to be transferred, combined with the need to have the match data processed and new heatmaps generated in near real-time, is simply too large.

In one embodiment, two dimensional (2D) and three dimensional (3D) maps which are part of the game's local client code are repurposed to generate a heatmap. The system executes a plurality of programmatic instructions that acquire at least one of a two dimensional (2D) and a three dimensional (3D) map. Optionally, the system executes a plurality of programmatic instructions that processes the two dimensional (2D) and/or the three dimensional (3D) map to modify it visually, such as by modifying luminance, contrast, hue, brightness, color, size, resolution, brilliance, exposure, highlights, shadows, black point, saturation, intensity, neutrals, tone, and/or grain. The system then executes a plurality of programmatic instructions that combine the optionally modified the two dimensional (2D) and/or the three dimensional (3D) map with the plurality of cells (grid of data) associated with the player's game mode, provided the map relates to that game mode. To achieve this combination, the heatmap data, previously described as a single 2D or 3D plurality of cells (grid of data) which represents the aggregation of data from recent matches played, is scaled up to the size of a two dimensional (2D) and/or the three dimensional (3D) geographical map using a Gaussian blur, blurring, or other smoothing technique. For example, a 30×30 grid of data can be scaled to 1024×1024 to match the size of the underlying geographical map image. This can be done quickly and efficiently in the client and removes the need to perform this on a server and download a relatively large image file to display the heatmap.

Figure 4:
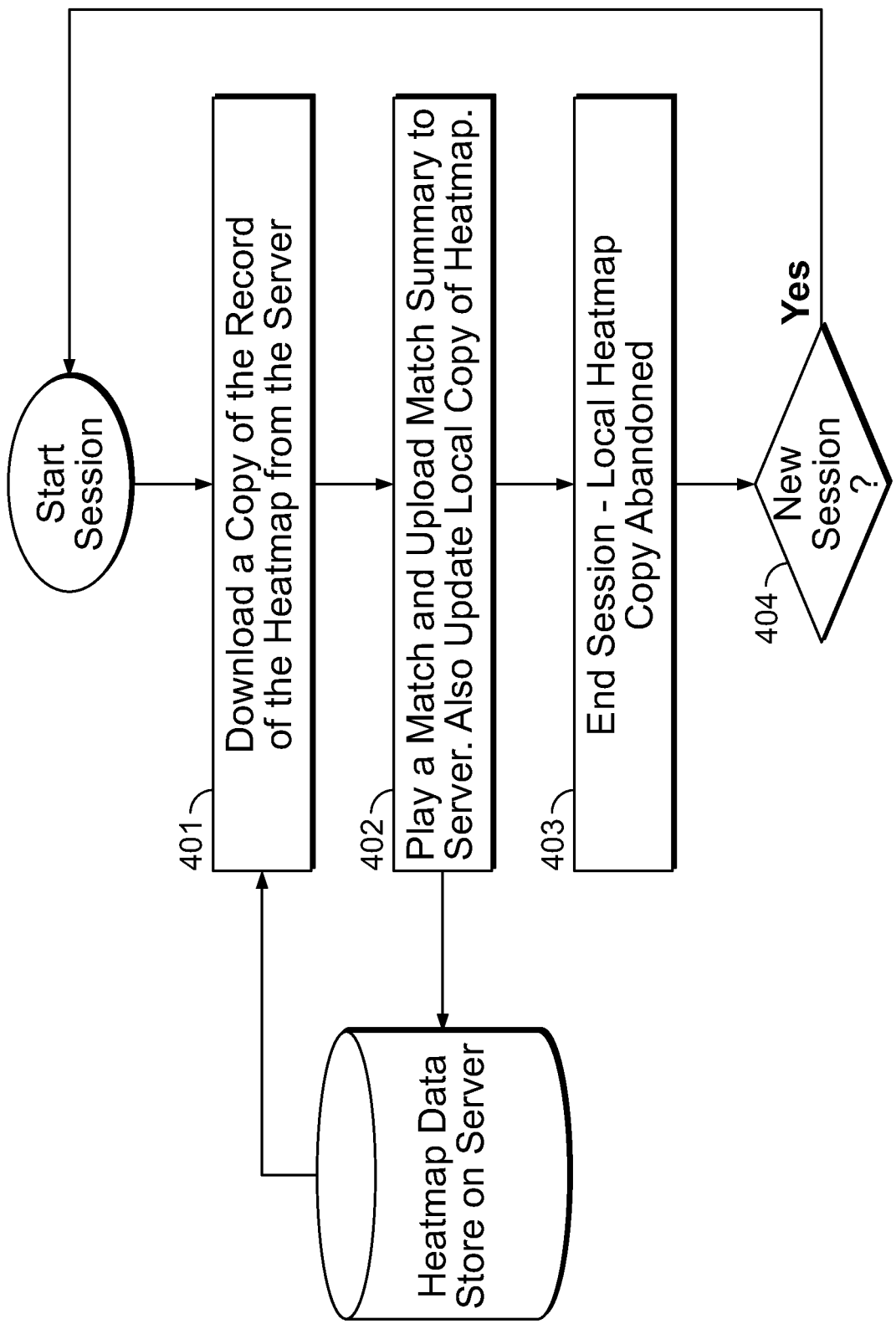
FIG. 4 is a flowchart illustrating a method of updating heatmaps in real time, according to one embodiment of the present specification.

Operationally, in one embodiment, the system executes a plurality of instructions that causes the client to access a server that has stored in associated memory a player's historical match summary information when that player initiates a gaming session, which is defined as a series of discrete matches played without disconnecting from the game. FIG. 4 is a flowchart illustrating a method of updating heatmaps in real time. Referring to FIG. 4, in the first step 401, at the beginning of a session the client downloads a copy of the historical match summary information from the server. At the end of every match, the client sends a match summary to the remote server, and simultaneously performs local updates to its copy of the heatmap data 402. It may be noted that the heatmap data is not sent to the server during the session. Rather, as part of normal game operation a match summary or heatmap data is sent at the end of every match to a server. The data in this match summary is used to update the server. The server is thus only dependent on match summaries for data. The local updates to heatmap data performed on the client can thus be considered transient and are never transmitted back to the server. In one embodiment, the local copy of heatmap data is abandoned at the end of each session, as shown in step 403. When the player next plays a session, as shown in 404, the server side data would have been updated with information from all match summaries it had received from the last session and the latest data is downloaded by the client again (step 401 repeated). This process ensures that a permanent record of heatmap data is present on the server and a transient copy is present and updated, in real-time, on the client just for the duration of one session. If the player disconnects during a session, the transient data may be lost but the historical copy of heatmap data would still be stored and available to be restored at the initiation of the next session, thereby minimizing lost heatmap data. This process also avoids having to rely on real-time communications with a server to repeatedly update and download heatmaps during a gaming session. The ability to do this in real-time is problematic as there typically is some lag involved in getting match summary information through a pipeline of operations to be able to perform the update.

Figure 5:
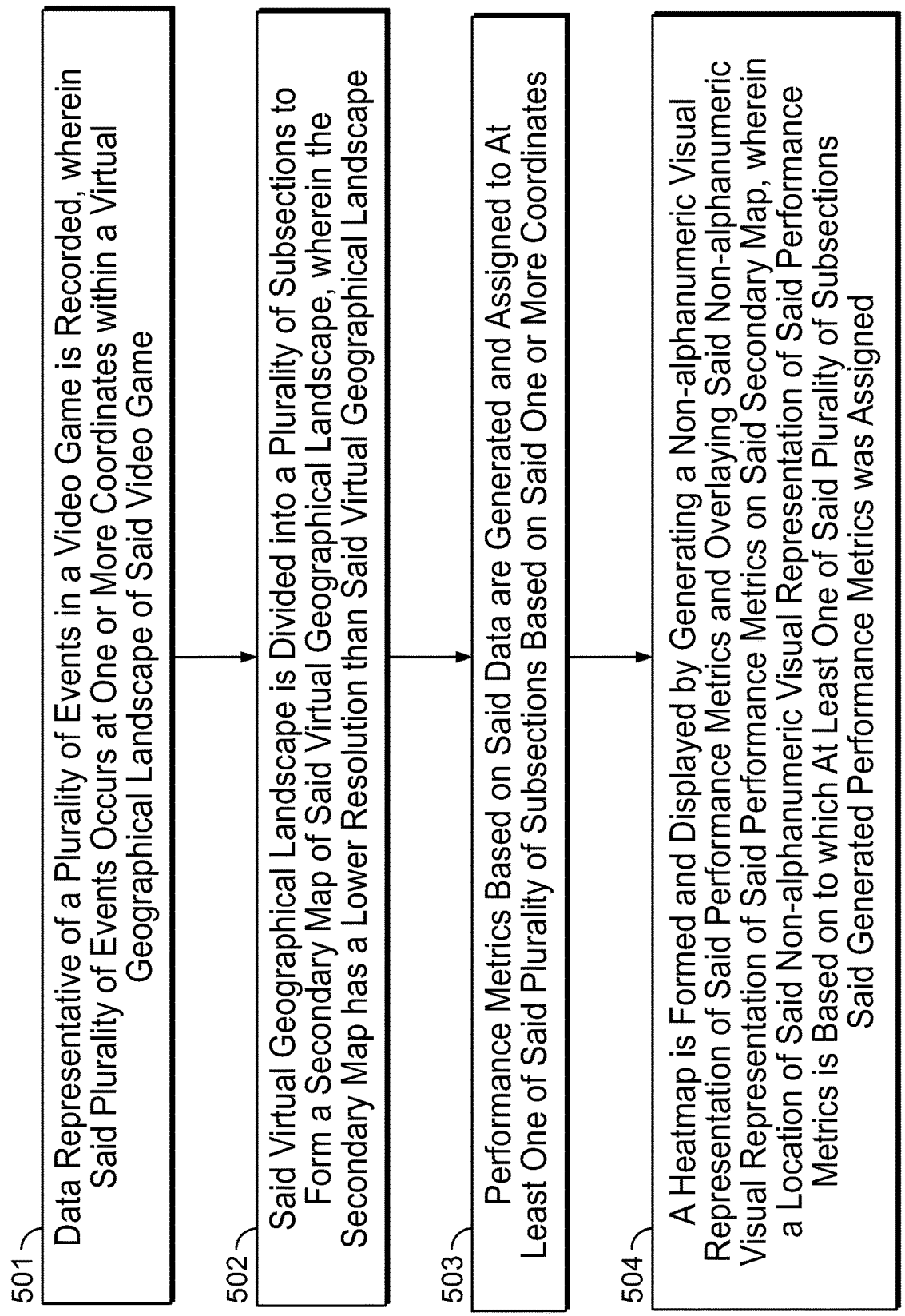
FIG. 5 is a flowchart illustrating a computer-implemented method for generating and displaying a heatmap while a player is actively playing a video game on a computing device, according to one embodiment of the present specification.

FIG. 5 is a flowchart illustrating a computer-implemented method for generating and displaying a heatmap while a player is actively playing a video game on a computing device, according to one embodiment of the present specification. At step 501, data representative of a plurality of events in a video game is recorded, wherein said plurality of events occurs at one or more coordinates within a virtual geographical landscape of said video game. Said virtual geographical landscape is divided into a plurality of subsections to form a secondary map of said virtual geographical landscape at step 502, wherein the secondary map has a lower resolution than said virtual geographical landscape. Performance metrics based on said data are generated and assigned to at least one of said plurality of subsections based on said one or more coordinates at step 503. Then, at step 504, a heatmap is formed and displayed by generating a non-alphanumeric visual representation of said performance metrics and overlaying said non-alphanumeric visual representation of said performance metrics on said secondary map, wherein a location of said non-alphanumeric visual representation of said performance metrics is based on to which at least one of said plurality of subsections said generated performance metrics was assigned.

In the description and claims of the application, each of the words "comprise" "include" and "have", and forms thereof, are not necessarily limited to members in a list with which the words may be associated.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A computer-implemented method for generating a heatmap while a player is actively playing a video game on a computing device comprising:
   recording data representative of a plurality of events in the video game, wherein said plurality of events occurs at one or more coordinates within a virtual geographical landscape of the video game;
   forming a secondary map by dividing said virtual geographical landscape into a plurality of subsections, wherein the secondary map has at least one of a smaller width, a smaller height, or a smaller number of pixels than the virtual geographical landscape map;
   generating performance metrics based on said data;
   assigning said generated performance metrics to at least one of the plurality of subsections based on the one or more coordinates; and
   forming the heatmap by generating a non-alphanumeric visual representation of the performance metrics and overlaying the non-alphanumeric visual representation of the performance metrics on the secondary map, wherein the overlaying is based on to which of the plurality of subsections the generated performance metrics was assigned.

2. The computer-implemented method of claim 1 wherein the heatmap is generated locally on the computing device.

3. The computer-implemented method of claim 1 wherein a size of each of the plurality of subsections is based on an amount of the data representative of a plurality of events that has been recorded.

4. The computer-implemented method of claim 1 wherein the non-alphanumeric visual representation of the performance metrics is achieved by varying at least one of a color, a luminance, a hue, a brightness, or a contrast of a pixel as a function of a value of each of the performance metrics.

5. The computer-implemented method of claim 1 wherein the performance metrics include at least one of a kill/death ratio, a score per minute, an amount of time spent, a path pattern, a player lane use pattern, an objective path pattern, a use of a special ability, an accuracy of weapon use, a number of points obtained, a number of points lost, a number of achievements obtained, a number of achievements lost, an amount of health status obtained, an amount of health status lost, an amount of tokens obtained, an amount of tokens lost, an amount of treasure obtained, or an amount of treasure lost.

6. The computer-implemented method of claim 1 wherein the performance metrics are generated by weighing data representative of a plurality of events in the video game that have been recorded later in time more heavily than data representative of a plurality of events in the video game that have been recorded earlier in time.

7. The computer-implemented method of claim 1 wherein the performance metrics are generated by applying a smoothing function on the data, wherein said smoothing function weights data from a new game played more than data generated from games played before the new game.

8. The computer-implemented method of claim 1 wherein the performance metrics are generated by applying a function represented by:

$$s_t = \alpha \cdot x_t + (1-\alpha) \cdot s_{t-1}$$

wherein $s_t$ is a new metric after updating with data from a new game played, $\alpha$ is a smoothing factor, $x_t$ is the data from the new game played, and $s_{t-1}$ is a previous metric before the new game was played.

9. The computer-implemented method of claim 1 wherein the heatmap is one of a plurality of different heatmaps, wherein the video game comprises a plurality of modes and wherein a different one of the plurality of different heatmaps is generated for each of said plurality of modes.

10. A computer readable non-transitory medium comprising a plurality of executable programmatic instructions wherein, when the plurality of executable programmatic instructions are executed by a processor in a computing device, a process for generating a heatmap is performed while a player is actively playing a video game on the computing device, the plurality of executable programmatic instructions comprising:
   programmatic instructions, stored in the computer readable non-transitory medium, for recording data representative of a plurality of events in the video game, wherein the plurality of events occurs at one or more coordinates within a virtual geographical landscape of the video game;
   programmatic instructions, stored in said computer readable non-transitory medium, for forming a secondary map by dividing the virtual geographical landscape into a plurality of subsections, wherein the secondary map has at least one of a smaller width, a smaller height, or a smaller number of pixels than the virtual geographical landscape;
   programmatic instructions, stored in the computer readable non-transitory medium, for generating performance metrics based on the data;

assigning the generated performance metrics to at least one of the plurality of subsections based on the one or more coordinates; and programmatic instructions, stored in the computer readable non-transitory medium, for forming the heatmap by generating a non-alphanumeric visual representation of the performance metrics and overlaying the non-alphanumeric visual representation of the performance metrics on the secondary map, wherein the overlaying is based on to which of the plurality of subsections the generated performance metrics was assigned.

11. The computer readable non-transitory medium of claim 10 wherein the heatmap is generated locally on the computing device.

12. The computer readable non-transitory medium of claim 10 further comprising programmatic instructions, stored in the computer readable non-transitory medium, for determining a size of each of the plurality of subsections, wherein the size of each of the plurality of subsections is based on an amount of the data representative of a plurality of events that has been recorded.

13. The computer readable non-transitory medium of claim 10 further comprising programmatic instructions, stored in the computer readable non-transitory medium, for generating the non-alphanumeric visual representation of the performance metrics by varying at least one of a color, a luminance, a hue, a brightness, or a contrast of a pixel as a function of a value of each of the performance metrics.

14. The computer readable non-transitory medium of claim 10 wherein the performance metrics include at least one of a kill/death ratio, a score per minute, an amount of time spent, a path pattern, a player lane use pattern, an objective path pattern, a use of a special ability, an accuracy of weapon use, a number of points obtained, a number of points lost, a number of achievements obtained, a number of achievements lost, an amount of health status obtained, an amount of health status lost, an amount of tokens obtained, an amount of tokens lost, an amount of treasure obtained, or an amount of treasure lost.

15. The computer readable non-transitory medium of claim 10 further comprising programmatic instructions, stored in the computer readable non-transitory medium, for weighing data representative of a plurality of events in the video game that have been recorded later in time more heavily than data representative of a plurality of events in the video game that have been recorded earlier in time in order to generate the performance metrics.

16. The computer readable non-transitory medium of claim 10 further comprising programmatic instructions, stored in the computer readable non-transitory medium, for applying a smoothing function on the data, wherein the smoothing function weights data from a new game played more than data generated from games played before the new game.

17. The computer readable non-transitory medium of claim 10 further comprising programmatic instructions, stored in the computer readable non-transitory medium, for applying a function represented by:

$$s_t = \alpha \cdot x_t + (1-\alpha) \cdot s_{t-1}$$

wherein $s_t$ is a new metric after updating with data from a new game played, $\alpha$ is a smoothing factor, $x_t$ is the data from the new game played, and $s_{t-1}$ is a previous metric before the new game was played.

18. The computer readable non-transitory medium of claim 10 wherein the heatmap is one of a plurality of different heatmaps, wherein the video game comprises a plurality of modes, and wherein the computer readable non-transitory medium further comprises programmatic instructions, stored in the computer readable non-transitory medium, for generating a different one of the plurality of different heatmaps for each of said plurality of modes.

19. The computer readable non-transitory medium of claim 10 further comprising programmatic instructions, stored in the computer readable non-transitory medium, for scaling up a size of the heatmap.

20. The computer readable non-transitory medium of claim 19 further comprising programmatic instructions, stored in the computer readable non-transitory medium, for applying a blurring or smoothing technique for scaling up the size of the heatmap.

* * * * *